Dec. 21, 1948.　　　　　N. LACROTTE　　　　　2,457,103
FIRE HAZARD AND SAFETY DEVICE FOR AIRPLANES
Filed April 25, 1938
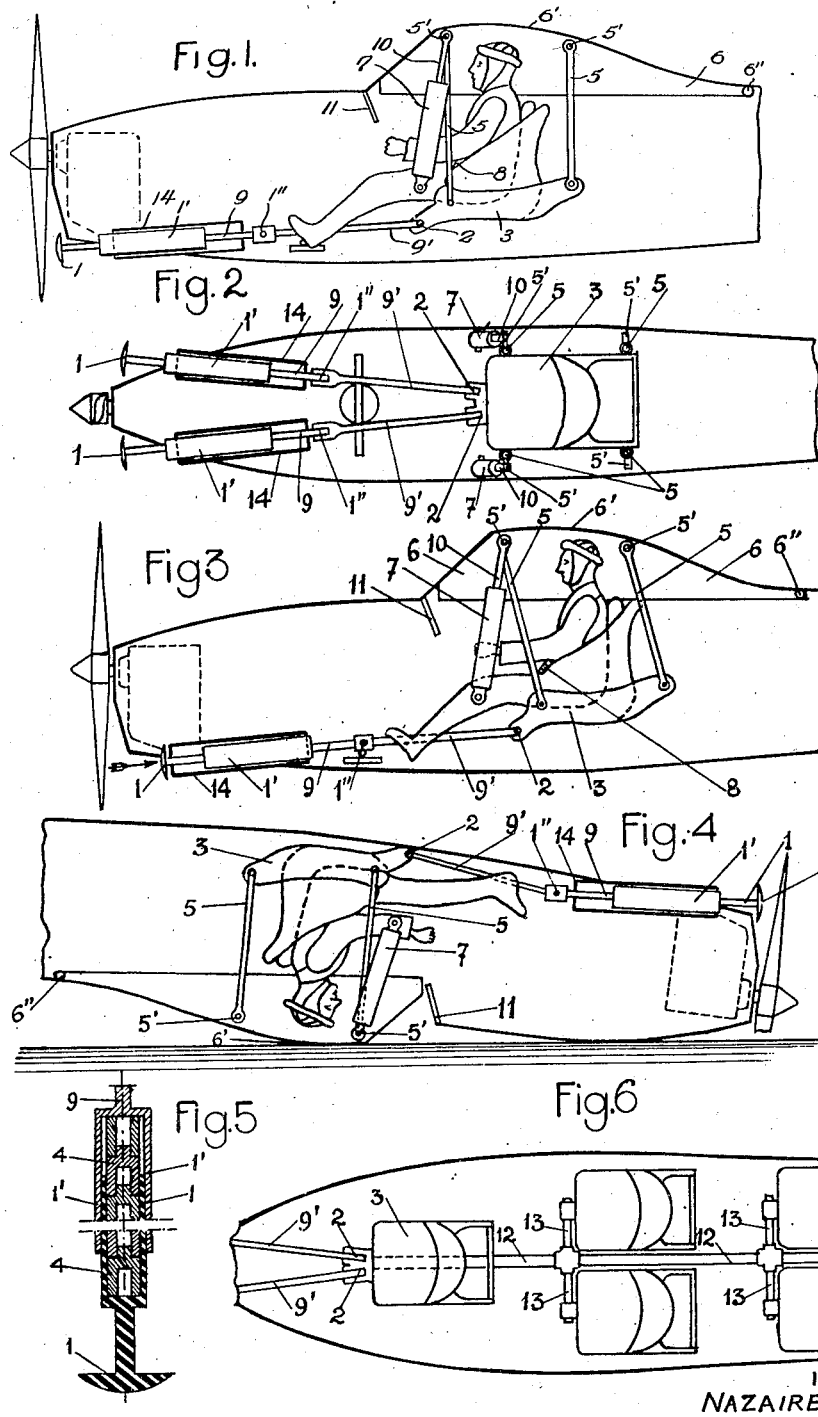
INVENTOR
NAZAIRE LACROTTE
BY
Richards & Geier
ATTORNEYS Patented Dec. 21, 1948

2,457,103

UNITED STATES PATENT OFFICE 2,457,103

FIRE HAZARD AND SAFETY DEVICE FOR AIRPLANES

Nazaire Lacrotte, Paris, France; Le Directeur des Domaines, temporary (provisional) executor or administrator of the estate of said Lacrotte, deceased Application April 25, 1938, Serial No. 204,097
In Luxemburg April 26, 1937

Section 3, Public Law 690, August 8, 1946
Patent expires April 26, 1957

6 Claims. (Cl. 244—1)

The invention has for its object a safety device which protects the pilot and the passengers of an aeroplane, in case of an accident on the ground, either on landing or in taking off, by means of an arrangement of the seats such as to absorb shocks, by automatically breaking the ignition contact of the engine and by automatically releasing a preventive extinguisher system as soon as the aeroplane strikes the ground.

The invention essentially consists in the suspension of the seats in such a manner as to enable them, according to circumstances, either to move towards the rear responsive to the action of buffers which come into contact with the ground (case of a nose dive), or to move down towards the bottom of the cockpit by contact of the roof of the cockpit with the ground (case of overturning).

The above mentioned movements, which are transmitted by any usual means such as a sheathed cable or a rod, enable the ignition of the engine to be automatically cut off and effect the automatic release of an extinguisher of the usual type in aviation, such as a foam extinguisher, which preventively smothers the power plant when the aeroplane impinges violently on the ground.

The accompanying drawing shows, by way of example, an embodiment of the device which is the object of the invention.

In said drawing:

Fig. 1 is a side elevation in part section, of the body of a single seater aeroplane equipped according to the invention, the safety device being in the inoperative position.

Fig. 2 is a plan view of the inside of the aeroplane corresponding to Fig. 1.

Fig. 3 shows the position taken up by the pilot's seat in the case of a nose dive.

Fig. 4 shows the position of the seat and of the cockpit in the case of overturning.

Fig. 5 is a sectional view of a telescopic buffer.

Fig. 6 is a diagrammatical view of the arrangement of the seats for a multi-seater aeroplane.

As can be seen in the drawing, two telescopic buffers 1 which are arranged under the nose of the engine extend to the joints 2 of the pilot's seat 3. Said telescopic buffers 1 comprise shock absorbing elements 4 (see Fig. 5) made of rubber which are enclosed in cases 1' which are extended by rods 9 pivoted at 1'' on rods 9' that extend to 2. Slideways 14 which are fixed in the body ensure the rectilinear movement of the telescopic buffers 1.

The pilot's seat 3 is suspended by rods 5 on pivots 5' which are fixed to the ceiling 6' of the cockpit 6. The cockpit 6, which is pivoted at 6'' on the body, is supported by the telescopic shock absorbers 7, the bodies of which are secured to the aeroplane body and the rods 10 of which are pivoted at 5' on the roof 6' of the cockpit. The pilot is held on his seat by a belt 8. An instrument panel 11, which is fixed on the body and placed under the pilot's eyes, generally forms the dangerous zone against which it is necessary to prevent the pilot from being thrown in case of a sudden impact.

Control devices for cutting off the ignition and releasing the extinguisher and comprising handles, levers, cams, etc., may be placed at any point of the movable arrangement, for example on the rods 9 and 10, and may be connected to the ignition device of the engine and to the extinguisher by means of cables, rods or any other means.

In the case of multi-seater aeroplanes, a method of connecting the passengers' seats with the pilot's seat for obtaining a uniform recoil, may consist in a shaft 12 having cross-bars 13.

The device operates as follows:

When, owing to an accident, the aeroplane reaches the ground in a nose dive, the buffers 1, which are pushed back in the direction of the arrow (see Fig. 3) in the slideways 14, compress the shock absorber elements 4, then, through the instrumentality of the rods 9 and 9', push back the pilot's seat 3 towards the rear of the aeroplane. This backward movement is accompanied by a pivoting of the seat 3 about the pivots 5'. Owing to this fact, the pilot, who is held on his seat by the belt 8, is automatically moved away from the dangerous zone formed by the panel 11.

When the aeroplane overturns, the partial driving of the roof 6' of the cockpit into the aeroplane body by swinging about the pivot 6'', has the effect of driving the rods 10 into the telescopic shock absorbers 7 which remain stationary since they are secured to the body; consequently the rods 5 cause the whole of the seat 3 to swing about the pivot 1'' which is held stationary in this operation by the telescopic buffers 1.

It will be understood that the movement of one of the members of the device, for example of the rod 9 or the rod 10, may be used to actuate devices for cutting off the ignition of the engine and for preventive extinction.

It is obvious that numerous modifications may be made in the device which has just been described and illustrated. Thus, the shape and the arrangement and also the extent of the recoil of the buffers and of the seats made be varied to enable them to be adapted to different kinds of aeroplanes, without exceeding the scope of the invention.

Similarly, the recoil movement and the inward movement of the seats may be combined and take place substantially at the same time, when the nose dive is accompanied by overturning.

I claim:

1. A safety device for aeroplanes, comprising in combination with an aeroplane body; a movable cockpit, means pivotally connecting said cockpit with the aeroplane body, a seat means connected with said seat and said cockpit for suspending said seat from the roof of said cockpit, a telescopic buffer connected with said aeroplane body and the second-mentioned means, another telescopic buffer situated at the front of the aeroplane body, and means connecting the second-mentioned buffer with said seat.

2. The device in accordance with claim 1, which comprises a member for cutting off the ignition of the engine, extinguishers, and connecting members responsive to the movement of the movable part of the device and thereby automatically ensuring the cutting off of the engine ignition and the automatic release of the extinguishers for preventingly smothering the engine.

3. A safety device for aeroplanes, comprising in combination with an aeroplane body; a movable cockpit, means pivotally connecting said cockpit with the aeroplane body, a seat, means connected with said seat and said cockpit for suspending said seat from the roof of said cockpit, a telescopic buffer connected with said aeroplane body and the second-mentioned means, another telescopic buffer situated at the front of the aeroplane body, rods connected with the second-mentioned buffer and said seat to cause said seat to swing when the aeroplane body nosedives to the ground, and a guide engaging one of said rods.

4. A safety device for aeroplanes, comprising in combination with an aeroplane body; a movable cockpit, means pivotally connecting said cockpit with the aeroplane body, a seat, means connected with said seat and said cockpit for suspending said seat from the roof of said cockpit, a telescopic buffer connected with said aeroplane body and the second-mentioned means, another telescopic buffer situated at the front of the aeroplane body, and means connecting the second-mentioned buffer with said seat and causing a turning of said seat when the cockpit is driven into the aeroplane body by the overturning of the aeroplane body.

5. A safety device for aeroplanes, comprising in combination with an aeroplane body; a movable cockpit, means pivotally connecting said cockpit with the aeroplane body, a seat, means connected with said seat and said cockpit for suspending said seat from the roof of said cockpit, a telescopic buffer connected with said aeroplane body and the second-mentioned means and comprising a rubber shock-absorbing element, another telescopic buffer comprising a rubber shock-absorbing element situated at the front of the aeroplane body, and means connecting the second-mentioned buffer with said seat.

6. A safety device for aeroplanes, comprising in combination with an aeroplane body; a movable cockpit, means pivotally connecting said cockpit with the aeroplane body, a plurality of seats, means connected with said seats and said cockpit for suspending said seats from the roof of said cockpit, a shaft, cross bars connected with said shaft and said seats for rigidly securing the seats to each other, said shaft imparting simultaneously the same movement to the various seats, a telescopic buffer connected with said aeroplane body and the second-mentioned means, another telescopic buffer situated at the front of the aeroplane body, and means connecting the second-mentioned buffer with one of said seats.

NAZAIRE LACROTTE.

REFERENCES CITED

The following references are of record in the file of this patent:

UNITED STATES PATENTS

| Number | Name | Date |
| --- | --- | --- |
| 1,104,429 | Lacrotte | July 21, 1914 |
| 1,308,997 | Simmons | July 8, 1919 |
| 1,776,766 | Fox | Sept. 23, 1930 |
| 1,956,484 | Bate | Apr. 24, 1934 |
| 2,106,985 | Miller | Feb. 1, 1938 |